Aug. 19, 1941.                J. A. VAN DEN AKKER                2,253,356
       METHOD AND APPARATUS FOR MEASURING THE WATER RESISTANCE OF PAPER
                              Filed Aug. 12, 1939
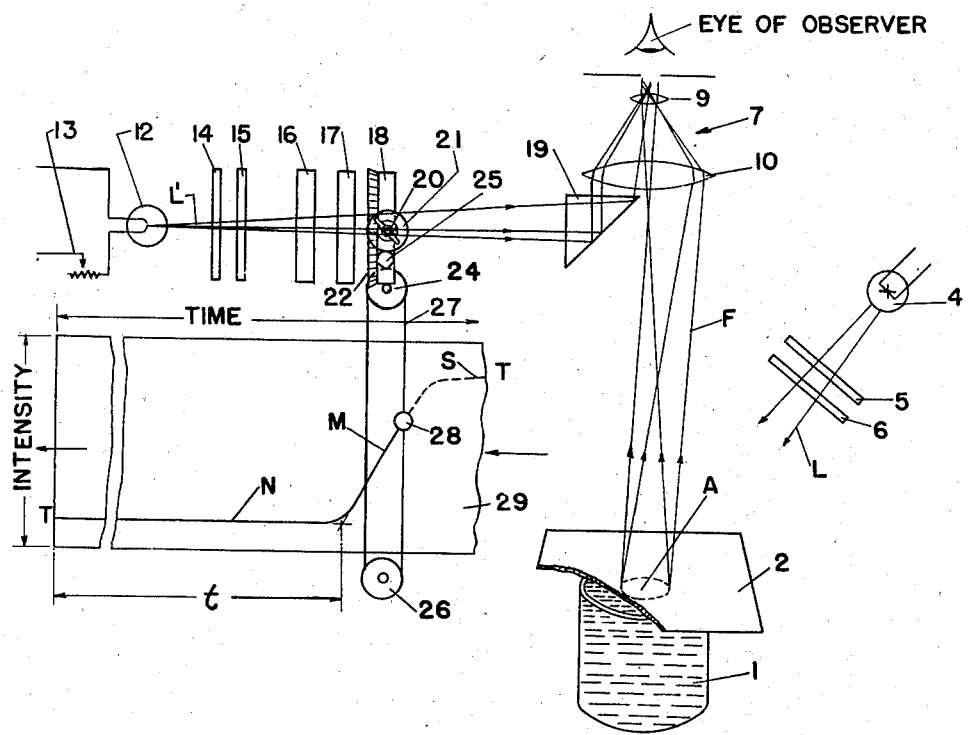
JOHANNES A. VAN DEN AKKER
INVENTOR
ATTORNEY Patented Aug. 19, 1941

2,253,356

UNITED STATES PATENT OFFICE 2,253,356

METHOD AND APPARATUS FOR MEASURING THE WATER RESISTANCE OF PAPER

Johannes A. Van den Akker, Appleton, Wis., assignor to The Institute of Paper Chemistry, Appleton, Wis., a corporation of Wisconsin Application August 12, 1939, Serial No. 289,842

7 Claims. (Cl. 73—51)

The present invention relates to the testing of papers, and more particularly to a method and apparatus for measuring the water resistance of paper, cardboard, or the like.

The present invention aims to provide an improved method and apparatus for measuring the length of time papers are capable of resisting the transudation of water or other liquids, that is, the passing of water through the pores, interstices or fibers of the paper, cardboard or the like.

An object of the invention is to provide a simple, inexpensive apparatus for measuring the resistance of paper to liquids such as water or oil and the like.

Another object is to provide a rapid, accurate method of measuring the water resistance of paper, which is reliable and is not affected by personal element or human error.

Another object is to provide a sizing test for measuring the water resistance of paper, wherein means are utilized which have a sharp and definite end point, indicating that fluid has transuded through the paper.

A further object is to provide a method of measuring the water resistance of paper by a means not subject to error due to vapor transmission through the paper and without error due to absorption of water vapor from the atmosphere by the means employed to detect the end point.

Other and further objects of the invention will be obvious upon an understanding of the illustrative embodiment about to be described, or will be indicated in the appended claims, and various advantages not referred to herein will occur to one skilled in the art upon employment of the invention in practice.

These objects, generally, are accomplished by applying an indicator, having a distinct change of fluorescent characteristics when brought into solution with the penetrating liquid, to a sheet of paper to be tested. The sheet is illuminated by ultra-violet light and the underside thereof is placed in contact with a liquid to commence transudation. The indicator is then observed to note changes of intensity of fluorescence thereof, and the time required to produce a definite change in the fluorescent effect of the indicator is determined. A record of these changes may be made in a suitable manner, for example, by providing a comparison beam adapted to be varied to match the fluorescent light of the indicator and means controlled by varying the comparison beam for recording the changes of intensity of the fluorescent light on a chart as a function of time.

An embodiment of the invention has been chosen for purposes of illustration and description and is shown in the accompanying drawing, forming a part of the specification, wherein the single figure is a diagrammatic view, illustrating an embodiment of the invention.

Referring more particularly to the drawing, there is shown a vessel 1 filled to the brim with a suitable liquid such as water, and a sheet of paper 2 placed on the vessel with its underside in contact with the liquid to permit the liquid to transude through the sheet. The upper surface of the sheet, above the area of the underside which is in contact with the liquid, has an indicator A applied thereto in a manner described hereafter. This indicator is of the type adapted to emit a fluorescent light when wetted by or dissolved in the liquid and excited by suitable light. For example, a dye of phthalic anhydride type color condensed with resorcinol (known to the trade as "Uranine B") is suitable for this purpose, because of its intense and definite change from a reddish-brown, when dry, to a characteristic and strong greenish-yellow fluorescence when in dilute solution. Other dyes which may be used are known commercially as "Rhodamine B," "Rhodamine B Base," "Rhodamine 6 GX," and mixtures of "Quinoline Yellow Conc." and any of the rhodamine dyes. These mixtures have been found to fluoresce much more strongly in solution than the corresponding rhodamine dyes taken alone.

The indicator preferably is excited by means of a source of ultra-violet light which may be an ultra-violet lamp or a mercury arc 4 creating a beam of light L adapted to be filtered by an ultra-violet filter 5. With this arrangement nearly invisible ultra-violet light may be directed on the surface of the sheet having the indicator applied thereto.

The fluorescence of the indicator and the diffused reflection of the feeble visible light of the beam L may be observed through a suitable photometric eyepiece 7 comprising an eye lens 9 and a field lens 10, one half of which is adapted to be illuminated by the fluorescent light F of the indicator.

In order to observe variations in the intensity of the fluorescent light emitted by the indicator, a second source of light is provided for creating a comparison beam L' adapted to illuminate the other half of the field lens. This beam preferably has substantially the same color and hue as the fluorescent light beam and is adapted to be varied to match the intensity of the fluorescent light. To accomplish this, there is provided, a low wattage tungsten filament lamp 12 adapted to emit a beam L' having a substantially constant color temperature which may be adjusted by a rheostat 13 for varying the current consumption of the lamp. The beam of light L' is directed through a suitable filter 14 and a sheet of yellow Cellophane 15 adapted to filter the light in such a manner that its final color matches that of the color of the fluorescent light, which in this particular instance is yellow. Small changes in hue of the comparison light may be produced by varying the color temperature of the lamp.

The beam is further directed through, for example, three polarizing discs 16, 17, and 18, adapted to polarize the beam. The disc 16 may be rotated about an axis passing through its center and perpendicular to its plane to control the order of magnitude of intensity. The disc 17 preferably is non-rotatable and the disc 18 is rotatably mounted to vary the angle of polarization with respect to the angle of polarization of the light after passage through disc 17, thereby permitting control of the intensity of the light. To facilitate rotation of the disc 18, a suitably supported knob or hand wheel 20 may be provided which carries a bevel gear 21 adapted to mesh with an annular bevel gear 22 extending about the rim of the polaroid disc 18. The light passing through the discs is intercepted by a reflecting prism 19, adjacent the field lens, which is adapted to reflect the beam and cause the other half of the field lens to be illuminated by the comparison beam.

With this arrangement, variations of the intensity of the fluorescent light may be observed through the eyepiece and compared with the source of light passing through the polarizing discs, and these variations can be measured by noting the positions of the disc 18 when placed so that the light passing therethrough matches the intensity of the fluorescent light. The variations of intensity may be recorded by noting the angle at which the disc 18 is turned, and reckoning the intensity as being proportional to the square of the sine of this angle. As illustrated herein, the intensity may be recorded graphically as a function of time by a suitable mechanism, which may comprise a pulley 24 rotated by the gear 21 through the intermediation of suitable linkage or gearing and a well-known sine-squared cam arrangement 25, shown diagrammatically; a second pulley 26; a belt 27, supported and adapted to be moved by the pulleys; and a suitable marking instrument such as a pencil or pen carried by one strand of the belt. The pencil 28 is adapted to be moved transversely across a recording chart 29 which is moved beneath the belt at a predetermined rate of speed, by a suitable well-known mechanism (not shown). One ordinate of the chart thus may be utilized to indicate time, while the other ordinate thereof may be utilized to indicate intensity. As illustrated by the line T—T drawn on the chart, rotation of the disc 18 to match the beams L and L' causes the marking implement to be moved across the paper and record the change of intensity as a function of time.

Preliminary to testing a group of paper samples of similar type and composition, a portion of indicator dye is applied to one of the samples and water is permitted to transude therethrough. When sufficient time has elapsed for the fluorescence of the dye to reach its maximum brightness, the polarizing disc 18 is positioned at a nominal maximum setting, and the polarizing disc 16 is adjusted to obtain an approximate brightness match. Any difference in hue of the color of the beams may then be adjusted by increasing or decreasing the current supplied to the comparison beam lamp 12 by means of the rheostat. These preliminary adjustments insure that the indications will be in the proper range during the subsequent tests, and that the hue will match closely enough to permit accurate brightness matching.

In practicing the invention a relatively small quantity of indicator dye A is applied to the paper to be tested. This quantity may range between 85 to 300 micrograms per 10 square centimeters, but preferably is in the neighborhood of 200 micrograms. With this amount of dye dilution thereof by transudation of water through the paper causes a very strong fluorescence of the dye. This concentration is believed to be fairly critical, for example, at a concentration of 50 milligrams per cubic centimeter (5% solution), the fluorescence was extremely weak. At about 5 milligrams per cubic centimeter the intensity of the fluorescence became appreciably stronger and a maximum intensity was obtained at 2.5 milligrams per cubic centimeter, although good results were obtained when the dilution was carried to the order of 2 milligrams per cubic centimeter.

A further advantage of using a relatively small amount of dye providing a high dilution, is that dyes generally are hygroscopic and have a tendency to absorb moisture from the air and thus become wetted to cause fluorescence. Where a small amount of dye was used, providing for example a concentration of 2.5 milligrams per cubic centimeter, it was observed that small clusters of the dye became wet on exposure to air of a relatively high humidity. Thus, in a test involving paper which is permeable to water vapor, but very resistant to the passage of liquid water, the dye on the top of the paper may become quite wet. In such a case, each particle may be visualized as being a small droplet of saturated solution with the original particle as a nucleus. However, these particles do not fluoresce with the characteristic yellow color, because the concentration is too high. Subsequently, when the liquid water transudes to the particles, the dye goes into solution in high dilution, and the characteristic bright yellow fluorescence is observed.

It has been found that the preferred quantities of dyes can be satisfactorily applied by utilizing dye having particles which pass through a 200-mesh screen, although preferably a dye of somewhat smaller particle size is used. A preferred method comprises applying the indicator dye A to the paper to be tested with a fine camel's hair brush and shaking off the excess dye after application. The particles of the dye applied in this manner cling to the superficial fibres of the paper and provide a brilliant fluorescent effect when brought into solution.

The sheet is then placed on the vessel 1, which previously has been filled to the brim with water, so that the underside of the sheet contacts the water. The recording chart 29 is put in motion at the moment the sheet contacts the water, and the polarizing disc 18 is continuously positioned to match the intensities of the comparison and fluorescent beams and to simultaneously position the marking instrument 28 on the chart.

At the outset of the test, the dye is excited by the nearly invisible ultra-violet light and produces a very slight fluorescent effect which may be observed through the eyepiece. This fluorescence does not vary materially in intensity while the dye is dry and when once matched by the comparison beam, no further adjustment of the polarizing disc 18 is required. As a result, the line drawn on the chart by the marker is straight as shown at N, which indicates that there has been no change in intensity. However, after sufficient time has elapsed and the water transudes through the sheet and comes into contact with the dye an increase in the intensity will be noted. This requires adjusting the angular position of the polarizing disc 18 which causes movement of the marker across the chart to record the change of intensity. At the moment the dye is wetted by water passing through the sheet a sharp, rapid increase in fluorescence occurs, necessitating a corresponding rapid adjustment of the disc 18. This adjustment causes the marker to record a sharply rising curve M unmistakably indicating the end point of the test. After the maximum intensity of fluorescence has been reached it remains substantially constant and the line on the chart again is straight, as shown in dotted lines at S. The distance $t$ between the end point curve M and the commencement of the line is preferably taken as representing the time of transudation. It has been observed that this time is practically independent of the amount of dye applied in the brushing application.

From the foregoing description it will be seen that the present invention provides a simple inexpensive apparatus for measuring the water resistance of paper, cardboard, or similar materials. The apparatus is efficient in operation and enables accurate measurements to be attained even by unskilled observers. Personal error or human element affecting the results are thereby eliminated. Furthermore an improved method of measuring and testing is provided, the results of which are not affected by permeability of the test specimen to water vapor. By utilizing a substantially non-hygroscopic indicator or an indicator which does not exhibit a change in fluorescent effect until in dilute solution a sharp, distinct end point is recorded which indicates precisely the length of time required for water to transude through the paper.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What I claim and desire to protect by Letters Patent is:

1. In a device of the class described, the combination of means for wetting the underside of a sheet of paper having a substance on the upperside adapted to fluoresce when wetted by the transudation of liquid through the paper, a source of ultra-violet light for directing a beam on the substance adapted to emit a fluorescent light, a second source of light for directing a beam, means cooperating with said source of light for providing its beam with a color the same as the color of the fluorescent light, means for observing and comparing the fluorescent light and the second beam, means for varying the intensity of the second beam to match it with the intensity of the fluorescent light, and means for varying the intensity of the second source of light to match the hue of the color of the fluorescent light and the beam.

2. In a device of the class described, the combination of means for wetting the underside of a sheet of paper having a substance on the upperside adapted to fluoresce when wetted by the transudation of liquid through the paper, a source of light for directing a beam on the substance adapted to emit a fluorescent light, a second source of light for directing a beam having substantially the same color as the fluorescent light, means for observing the fluorescent light and the second beam, and means including polarizing means for varying the intensity of the second beam to match it with the intensity of the fluorescent light.

3. In a device of the class described, the combination of means for wetting the underside of a sheet of paper having a substance on the upperside adapted to fluoresce when wetted by the transudation of liquid through the paper, a source of light for exciting the fluorescent substance adapted to emit a fluorescent beam, a second source of light for directing a beam, means for observing and comparing the pair of beams, means for varying the intensity of the second beam to match it with the intensity of the fluorescent beam, means for recording the intensity of the second beam with respect to intervals of time, and means for controlling said recording means by the operation of the varying means.

4. A method of measuring the water resistance of paper, which comprises directing a beam of light on a sheet of paper having a fluorescent indicator thereon adapted to emit a fluorescent light when wetted, placing the underside of the sheet of paper in contact with a liquid and permitting liquid to transude therethrough, comparing the intensity of the fluorescent light with a second beam of light, varying the intensity of the second beam to match the intensity of the fluorescent light, and measuring the intensity of the second beam to determine the intensity of the fluorescent light.

5. A method of measuring the water resistance of paper, which comprises directing a beam of ultra-violet light on a sheet of paper having a fluorescent indicator thereon adapted to emit a fluorescent light when wetted, placing the underside of the sheet of paper in contact with water to permit the water to soak through the paper and wet the indicator, comparing the intensity of the resulting fluorescent light with a second beam of light having the same color as the fluorescent light, varying the intensity of the second beam to match the intensity of the fluorescent light, and measuring the intensity of the second beam to determine the intensity of the first beam.

6. A method of measuring the water resistance of paper, which comprises directing a beam of light on a sheet of paper having a fluorescent indicator thereon adapted to emit a fluorescent light, placing the underside of the sheet of paper in contact with a liquid, comparing the intensity of the fluorescent light with a second beam of light, varying the intensity of the second beam to match the intensity of the fluorescent light, measuring the intensity of the second beam to determine the intensity of the fluorescent light, and recording the measurements as a function of time.

7. A method of measuring the water resistance of paper or the like, which comprises placing on a sheet of paper a relatively small quantity of a finely divided indicator which when so applied is adapted to fluoresce brilliantly in dilute solution but unaffected by absorption of moisture from the atmosphere, placing the underside of the sheet of paper in contact with a liquid, and measuring the intensity of fluorescence and the length of time required for the liquid to transude through the paper and bring the indicator in solution.

JOHANNES A. VAN DEN AKKER.